Patented Nov. 21, 1944

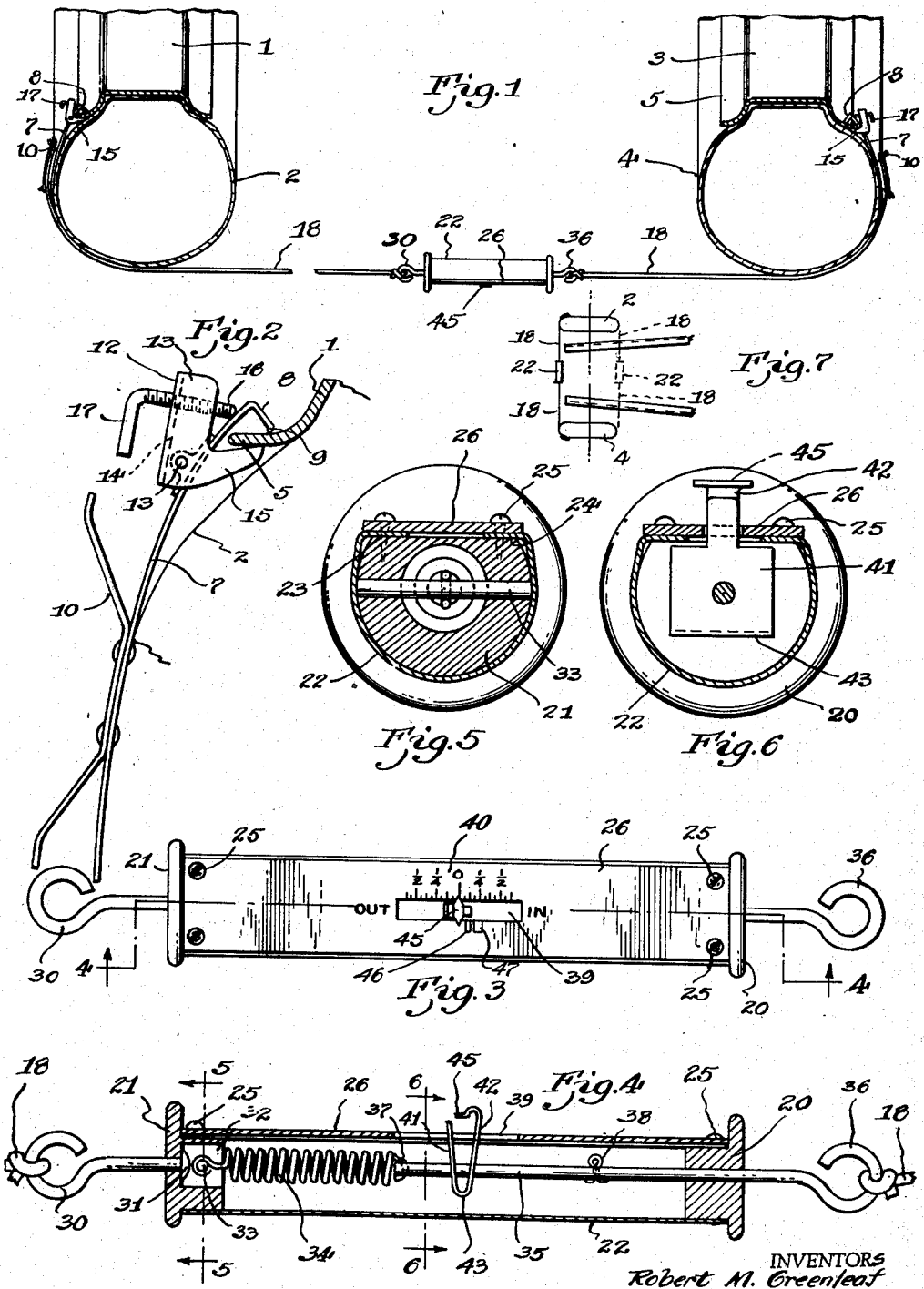

2,363,060

UNITED STATES PATENT OFFICE 2,363,060

GAUGE

Robert M. Greenleaf and John L. Hunt, Grosse Pointe, Mich., assignors to the M. L. Trust, F. R. Pendleton, trustee, Everett, Wash.

Application March 5, 1943, Serial No. 478,098

2 Claims. (Cl. 33—203)

This invention has to do with improvements in a gauge for the wheels of a vehicle, and it is directed particularly to the provision of an improved gauge for measuring the "toe-in" relationship.

The dirigible wheels of a vehicle and particularly the front wheels of an automotive vehicle are usually given a toe-in relationship. This relationship may vary with different vehicles, and the relationship is customarily placed in manufacturers' specifications. Unless such a relationship is substantially maintained, excessive wear of the tires may result. Improper steering of the vehicle may also be a result. Accordingly, for a nicety of action and for efficient use of rubber, it is desirable that this toe-in relationship be checked from time to time so that proper adjustments can be made if and when necessary.

The object of this invention is to provide an improved gauge of simple rugged structure which will provide an accurate reading of the toe-in relationship and which can be manufactured and supplied to the trade at a low cost. The gauge is one which does not require much skill on the part of the user, and it can be made at such a low cost that such a gauge should be obtained not only by all service organizations, but even by the ordinary filling station. Indeed, where a fleet of trucks or other vehicles are in use, or, in the case of vehicles of the armed forces, a number of such gauges may be available with such fleet.

The accompanying drawing shows a tool designed in accordance with the invention, and it also shows how the tool is used.

Fig. 1 is a view showing in cross section two wheels of a vehicle equipped with pneumatic tires, with the tool positioned thereon in use;

Fig. 2 is an enlarged view, showing an attaching device or gripper arranged to be fastened to the wheel rim;

Fig. 3 is an elevational view of the gauge;

Fig. 4 is a sectional view thereof taken substantially on the line 4—4 of Fig. 3;

Fig. 5 is an enlarged cross-sectional view taken substantially on the line 5—5 of Fig. 4, showing some of the structural features;

Fig. 6 is an enlarged cross-sectional view taken substantially on line 6—6 of Fig. 4, showing the pointer or indicator structure; and Fig. 7 is an ensmalled view, diagrammatically showing the front wheels and frame of a vehicle with the gauge in use.

In Fig. 1 the rim of a wheel is shown at 1, with its tire 2 thereon, while the opposite wheel rim is shown at 3 with its tire 4. The edges of the rims usually project slightly from the wall of the tire, as shown at 5, and it is to this edge of the rims that the grippers are attached.

Each gauge is provided with two grippers for attachment to the rims, and one gripper is shown in Fig. 2. The gripper has a body part which may comprise a strip of metal 7 advantageously having a curvature so as to, in a measure, fit against the tire. One end of the body is fashioned through substantially 90°, to provide a finger 8, the edge of which may be pointed or sharpened as at 9. Each gripper is provided with a suitable anchor 10 for a string or cord, as will presently appear, the anchor being attached to the body 7 and in a suitable manner.

A finger member generally illustrated at 12 is pivotally attached to the body as at 13. This finger member may be of formed metal, having side walls 13 connected by a back wall 14, and each side wall has a finger proper projecting therefrom, as shown at 15. A screw 16 is threaded through the back wall 12 and is designed to engage against the body 7. This screw has a suitable finger piece 17 by means of which it may be turned.

It will be observed, from a consideration of Fig. 2, that when the screw 16 is turned so that it advances to the right, the body member and the piece 12 are relatively pivoted so that the finger 8 and the fingers 15 approach each other and thus can be clamped to the edge 5 of the rim. As shown in Fig. 1, a gripper is attached to the rim of each wheel, and the anchors are employed to hold the line or cords 18.

The gauge itself embodies a body casing, with spring means and indicating means. As shown in Fig. 4, the casing comprises an end piece 20 which may be of wood or other suitable material and an end piece 21. These end pieces may be of rounded shape in cross section, as shown in Fig. 5, which are flattened on one side. An intermediate casing advantageously takes the form of sheet metal 22, fashioned to fit the end pieces and having its opposed edges overlying the flat portions as at 23 and 24, with the opposed edges spaced apart as shown. The shell 22 and the end pieces may be assembled together by suitable screws or the like, as shown at 25, and a cover plate 26 may also be held in position by the screws 25. The extreme ends of the members 20 and 21 may be enlarged, as shown, so that their cross dimensions or diameters are somewhat greater than the cross dimensions or diameter of the shell 22, thus offering a protection for the shell and the indicator.

An eye member is mounted at one end of the gauge so as to receive one of the cords 18. This eye member is shown at 30, the same extending through the end piece 21 and provided with a head 31. The end piece 21 may be hollowed out or cut away, to provide a recess 32. A pin 33 is located in the end piece 21 so as to extend across the recess 32, and anchored to the pin is a coil spring 34. This pin also keeps the eye member 30 from telescoping into the housing.

A tension rod or steelyard 35 passes through the end piece 20, and one end is provided with an eye 36 for receiving the cord 18, while the end inside the casing is anchored to one end of the spring as at 37. A suitable stop 38 is designed to engage the end piece 20 to limit the extension of the spring 34, largely for safety purposes. This stop may be in the form of a cotter pin, as illustrated.

The covering plate 26 is provided with an elongated aperture 39 paralleling the tension rod, and a suitable indicator passes through the aperture to cooperate with the scale indicia 40 on the exposed face of the covering plate. Incidentally, the covering plate may have printed thereon suitable instructions for the use of the gauge. The indicator is adjustable relative to the tension rod, and to this end the pointer or indicator may comprise a body of thin metal or sheet metal, bent upon itself substantially into U form, as shown in Fig. 4, so that it has an arm 41, an arm 42, and a bight portion 43. The arms 41 and 42 are apertured so that the tension rod runs therethrough, as shown in Figs. 4 and 6, and the apertures may be such that the rod has a fit therewith which is loose enough to permit the indicator to slide along the rod. However, the indicator is provided so that there is a spring action tending to separate the arms 41 and 42. This separating or expanding action causes the rod to be gripped by the two apertures so that the indicator normally moves with the tension rod.

The two arms 41 and 42 may be of considerable width for strength purposes, as shown in Fig. 6, thus providing an ample width for the bight 43 to give the indicator ample spring tension, and the two arms are reduced in cross dimension so as to pass through the aperture 39. One arm, such as the arm 42, is provided with a properly shaped pointer 45 positioned to overlie the cover plate and to cooperate with the indicia. The scale indicia may include supplemental areas for giving readings within permissible tolerances. For example, an area 46 may indicate the reading, within desirable tolerances, for certain vehicles such, for example, as the average passenger automobile. The area 47 may indicate the reading, within desirable tolerances, for commercial vehicles or trucks. For precise work, however, the increment indicia can be used and the reading checked with the manufacturer's specification. Obviously, if the reading does not conform with the proper or desired situation, adjustments may be made in the wheel mountings to correct the relative toe-in relationship.

The manner of use is as follows. First, the grippers are attached to the two wheel rims. The cords 18 are then attached to the grippers, and the cords or lines are pulled taut, in which action the spring 34 may be somewhat extended. The gauge body is light in weight, and the line is preferably tightened until the gauge is suspended without any appreciable or noticeable sag or looseness in the line. Thereupon the indicator is shifted and adjusted until the reading is zero, as shown in Fig. 3. This is done by applying the fingers to the arms 41 and 42 and pressing the arms toward each other to release the frictional engagement with the tension rod. When the frictional engagement is released, the pointer member may be easily shifted lengthwise of the tension rod and set at the zero position. In this original setting the grippers should be secured to the rims, or the vehicle shifted until the line or gauge is substantially horizontal and at a predetermined distance above the ground. The vehicle is now moved, causing the wheels to roll along the surface, and this is continued until the gauge passes center and is on the opposite side of the axle, as shown by the dotted lines in Fig. 7. The gauge should be brought to a position which is at the same height from the ground as the original starting position. At this point a reading of the gauge is taken. The spacing of the increments is preferably such as to provide a direct indication of the amount of toe-in. The indicia may be such as to impart the information desired in fractions of an inch, although it is feasible to give the indication in the metric system or, for that matter, in degrees. As a double check, the vehicle may now be moved back to its original starting position and a second reading taken. This second reading should be zero.

There are a number of advantages which flow from the use of this gauge. In the first place, the actual measurement is taken at the tread of the tires, this being the location that the toe-in relationship is designed to affect. Also, the reading is made under conditions of actual use in that the weight of the vehicle is on the wheels and the reading shows the condition which exists under these conditions. When making a test, it is usually necessary to move the vehicle so that the wheels roll over the lines 18, inasmuch as structural parts of the vehicle usually occupy the space between the wheels and above the axle. In this action the gauge can be expected to come into contact with the ground, but the enlarged spool-like end pieces are designed to engage the ground and thus keep the body portion or shell of the gauge free of the ground.

We claim:

1. A toe-in gauge for vehicle wheels having a spring and tension means between which the spring is interposed adapted for connection to cords or lines anchored to opposite wheels of a vehicle so that the gauge is suspended between the wheels, one of the tension means being a tension rod, means providing scale indicia paralleling the tension rod, an indicator for cooperation with the scale indicia, said indicator comprising a body of material fashioned substantially into U shape providing two arms and a bight portion, said arms having aligned apertures therein through which the tension rod extends, the bight portion providing a spring action tending to spread the arms whereby to cause the walls of the apertures to frictionally grip the tension rod, said frictional grip being releasable for the adjustment of the indicator along the rod by forcing the two arms toward each other.

2. A toe-in gauge for vehicle wheels, comprising a sheet metal body fashioned substantially into tubular form with one side thereof flat and disposed substantially on a chord of the circle of the tubular form, the flat side having a slot therein, means for providing scale indicia along the slot, end pieces secured to the ends of the tubular form and having flanges of greater cross dimension than the diameter of the tubular form, an attaching member anchored to one end piece, a tension rod slidably extending through the opposite end piece, a spring inside the tubular form having one end anchored to said one end piece, and having its other end connected to the tension rod, the attaching member and the tension rod being adapted for connection to cords on lines anchored to opposite vehicle wheels so that the gauge is suspended between the wheels, an indicator mounted on the tension rod and extending out through said slot and having a pointer on the outside of the tubular form which cooperates with the scale, said pointer lying within the peripheral limits of the flanges of the end pieces so that the pointer is protected from contact with the ground as the vehicle wheels roll.

ROBERT M. GREENLEAF.
JOHN L. HUNT.